Dec. 21, 1926.
A. W. RICHARDSON
CARBURETING APPARATUS
Filed Nov. 8, 1923
1,611,234
2 Sheets-Sheet 1
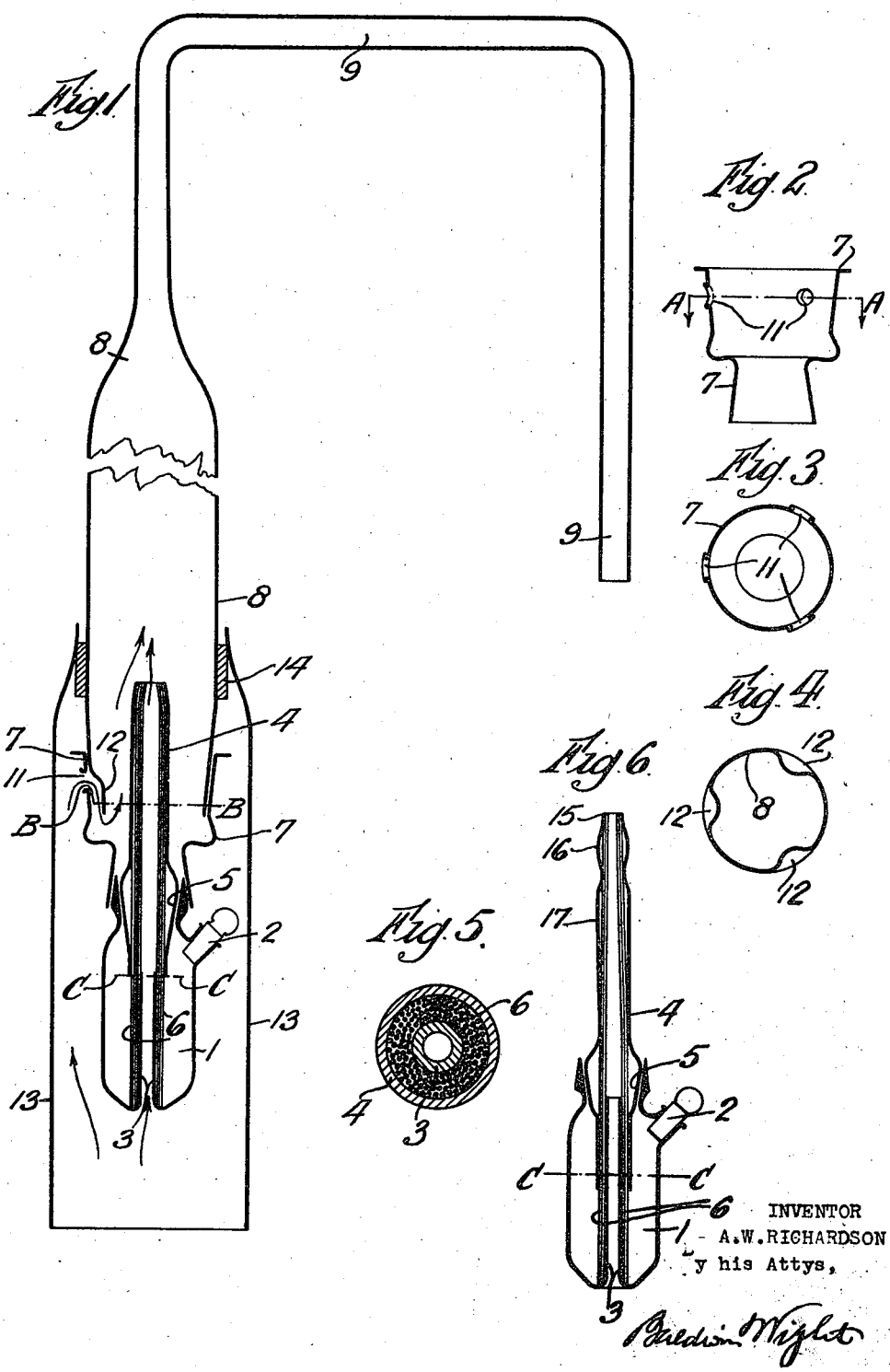
INVENTOR
A.W. RICHARDSON
y his Attys,

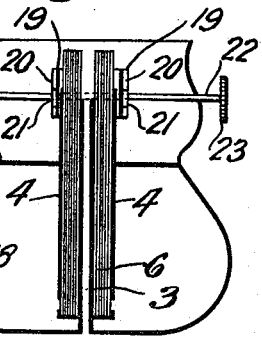
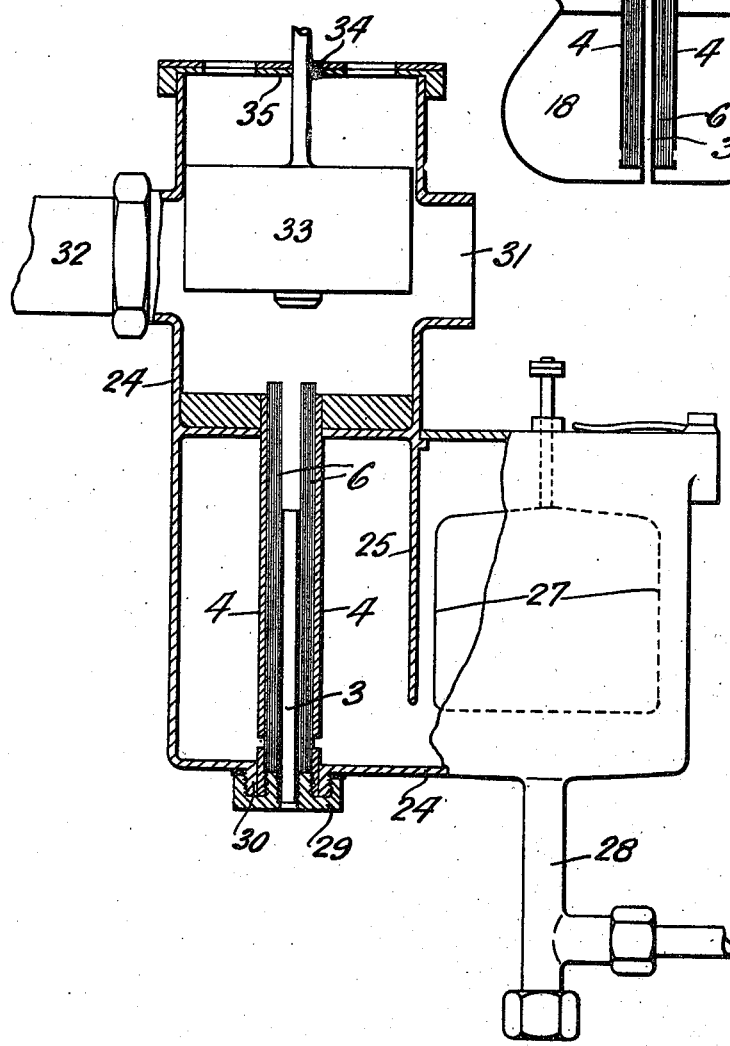

Patented Dec. 21, 1926.

1,611,234

UNITED STATES PATENT OFFICE.

ARTHUR WHITTAKER RICHARDSON, OF SHELL HAVEN, THAMES HAVEN, ENGLAND.

CARBURETING APPARATUS.

Application filed November 8, 1923, Serial No. 673,626, and in Great Britain November 22, 1922.

This invention relates to apparatus for carbureting air.

Apparatus constructed according to my invention comprises a vessel containing a combustible liquid into which dips a number of rods arranged in close proximity to one another in the form of a tube or bundle. When the rods are arranged in the form of a tube, the upper portion thereof may be enclosed in a sheath or tube, the spaces between the rods or between the rods and sheath forming capillary passages.

Preferably the rods are arranged around a tube which passes through the bottom of the vessel and serves to conduct a portion of the air necessary for combustion, the tube projecting above the level of the liquid in the vessel, while the upper ends of the rods are surrounded by a second tube touching or in close proximity to them.

In apparatus constructed according to this invention, the liquid in the vessel is drawn by capillary attraction up the rods tending to wet the whole surface of the rods and thereby saturate the air. Such apparatus is applicable for use generally, as, for example, a lamp for illuminating, or for testing purposes, or as a carbureter for internal combustion engines.

In one way of carrying out my invention as applied to a lamp for testing the sulphur content in hydrocarbon oils, the apparatus comprises a vessel into which a known quantity of oil to be tested is introduced. At the upper end of the vessel is a burner tube having inside it a number of small glass rods arranged in close proximity to each other and to the burner tube. The rods project downward beyond the burner tube to the bottom of the vessel. The vessel is also provided with a tube which projects upwardly from the bottom of the vessel, the bottom of the burner tube extending to or overlapping the upper part of the lower tube at which part the rods are enclosed between the two tubes. The vessel may be enclosed in a sealed chamber to the bottom of which air is admitted, the said chamber being provided with means for purifying the air which passes up the lower tube and burner tube. Surrounding the burner tube and attached to the top of the sealed chamber is a hood which leads to a collecting vessel. The hood is provided with means for regulating the quantity of air admitted to the outside of the burner tube.

When the invention is applied to an oil illuminating lamp, the rods may conveniently be arranged in a bundle surrounded at their lower ends by a tube and dipping into the oil, the surface area of wetted rods exposed to the air being regulated by an adjustable outer sleeve.

When the invention is applied to a carbureter, the rods are preferably arranged around a tube through which air passes and is carbureted thereby, the upper portion of the rods being surrounded by a sheath. The chamber or vessel into which the rods dip may conveniently be supplied with petrol or other liquid fuel from any known form of constant level chamber such as a float chamber.

In the accompanying drawings which illustrate the invention, Figure 1 is a diagrammatic vertical section of a test lamp. Figure 2 is a detail vertical section. Figure 3 is a section on the line A—A, Figure 2. Figure 4 is a section on the line B—B, Figure 1. Figure 5 is a detail section to a larger scale on the line C—C, Figures 1 and 6. Figure 6 is a diagrammatic vertical section of a modification. Figure 7 is a diagrammatic vertical section of a lamp for lighting. Figure 8 is a diagrammatic sectional elevation of a carbureter.

Referring now to Figures 1 to 6, 1 is a vessel into which a known quantity of oil to be tested is introduced through a stopper 2. The vessel 1 is provided at the bottom with an upwardly extending tube 3. 4 is a burner tube having a coned seating 5 fitting into a similar seating on the vessel 1. 6 are round glass rods which are packed around the tube 3 and inside the burner tube 4. The neck of the vessel 1 is coned on its exterior to receive a cap 7 which latter is also coned at its upper end so as to fit on to a coned seating on the lower end of a hood 8 which latter is provided with a pipe 9 leading to a collecting vessel (not shown). The cap 7 is provided with holes 11 which can be moved into or out of register with grooves 12 formed in the hood 8, so as to regulate the amount of air passing through the holes 11 to the burner tube 4. The vessel 1 is surrounded by a tube 13, an air tight joint between the upper end of this tube and the hood 8 being effected by means of a rubber gasket 14. The tube 13 may be provided with any known means (not shown) for purifying the air which passes through the tube 3 and holes 11.

The arrangement shown in Figure 1 has been found suitable for testing the sulphur content of kerosene, the burner tube 4 being 8.8 mm. in diameter incurved at the top to 7 mm. the glass rods 6 being .2 mm. approximately in diameter and the diameter of the tube 34.4 mm.

The arrangement shown in Figure 6, which has been found suitable for testing the sulphur content of benzene, differs from that shown in Figure 1 in that the diameter of the burner tube 4 at the points 15, 16 and 17, is 4.5 mm., 6.1 mm., and 6.8 mm. respectively, and further the tube 3 and burner tube 4 overlap one another for a considerable distance, as shown.

Referring now to Figure 7, which shows the invention applied to a lamp for lighting purposes, 18 is a container for the oil. 4 is a burner tube and 3 a tube extending upwardly from the base of the container 18 and serving to admit air to be carbureted. The space between the tubes 3 and 4 is filled with rods 6 which project a short distance above the top of the tube. 19 is a sleeve slidably mounted upon the tube 4 and provided with racks 20 in mesh with pinions 21 on a shaft 22 having a wheel 23 by means of which the sleeve 19 can be raised or lowered so as to regulate the area of the outside of the bundle of rods 6 exposed to the air.

Referring now to Figure 8, which shows the invention applied to a carbureter, 24 represents the body of the carbureter, the lower part of which is divided by a partition 25, one part so formed having any device of known construction such as the float 27 for regulating the level of the liquid supplied to the carbureter through a pipe 28. On the other side of the partition there are located tubes 3 and 4 screwed to a cap 29 which latter is provided with a central orifice and screws on to a boss 30, on the bottom of the carbureter. The space between the tubes 3 and 4 is filled with rods 6 as in the arrangement shown in Figures 1, 5 and 6. 31 is an inlet for admitting air to the carbureted air passing up the pipe 3, and 32 is an outlet which can be attached in any suitable manner to the manifold of an internal combustion engine (not shown). 33 is a sleeve valve forming a throttle valve which also serves to regulate the amount of air entering through the port 31. The upper end may be provided with means for admitting a variable quantity of additional air, the means illustrated consisting of a plate 34 having apertures which can be moved into or out of register with holes in a plate 35.

In all cases the apparatus may be so constructed as to allow the area of the wetted surface exposed to the air to be varied by altering the position of the sheath 4 and/or inner tube 3.

What I claim is:—

1. In apparatus for carbureting air, the combination of a vessel for containing a combustible liquid, two concentric tubes the inner of which is open at the top and serves to admit air to be carbureted and a bundle of rods which fill the space between the said tubes and to which the liquid is accessible, the said rods being of such diameter that the spaces between them form capillary passages substantially as described.

2. An arrangement as claimed in claim 1 in which the inner tube terminates below the top of the rods so that air is delivered part way up the rods, substantially as described.

3. An arrangement as claimed in claim 1 in which the rods are smooth and of regular cross sectional area, substantially as claimed.

4. An arrangement as claimed in claim 1 in which the rods are made of glass and are of uniform size, substantially as claimed.

In testimony that I claim the foregoing as my invention I have signed my name this 27th day of October, 1923.

ARTHUR WHITTAKER RICHARDSON.